(12) United States Patent
Ma et al.

(10) Patent No.: US 11,767,034 B2
(45) Date of Patent: Sep. 26, 2023

(54) SYSTEM AND METHOD OF COMPUTATION ACCELERATION FOR AUTONOMOUS DRIVING SYSTEMS

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 18/047,961

(22) Filed: Oct. 19, 2022

(65) Prior Publication Data

US 2023/0117617 A1 Apr. 20, 2023

Related U.S. Application Data

(60) Provisional application No. 63/366,738, filed on Jun. 21, 2022, provisional application No. 63/257,531, filed on Oct. 19, 2021.

(51) Int. Cl.
*B60W 60/00* (2020.01)
*G01C 21/00* (2006.01)

(52) U.S. Cl.
CPC ..... *B60W 60/0011* (2020.02); *G01C 21/3848* (2020.08); *B60W 2510/104* (2013.01); *B60W 2554/4049* (2020.02)

(58) Field of Classification Search
CPC ....... B60W 60/0011; B60W 2510/104; B60W 2554/4049; G01C 21/3848
See application file for complete search history.

(56) References Cited

U.S. PATENT DOCUMENTS

| | | | |
|---|---|---|---|
| 9,996,082 B2 * | 6/2018 | Glatfelter | G05D 1/0088 |
| 10,332,320 B2 * | 6/2019 | Lakshamanan | G06N 3/063 |
| 2018/0173232 A1 * | 6/2018 | Schwindt | G05D 1/0088 |

FOREIGN PATENT DOCUMENTS

WO 2020/204893 A1 10/2020

OTHER PUBLICATIONS

International Search Report and Written Opinion of the International Searching Authority dated Feb. 17, 2023 as received in Application No. PCT/US2022/047189.

* cited by examiner

*Primary Examiner* — Aaron L Troost
(74) *Attorney, Agent, or Firm* — Maschoff Brennan (57) ABSTRACT

A method may include identifying computing systems corresponding to an autonomous vehicle (AV) in which each computing system is configured to perform at least one operation relating to driving the AV. The method may include determining whether the computing systems use a first respective real-world parameter as an input to any of the operations or generate a second respective real-world parameter as an output of the operations. A respective operation corresponding to a respective computing system may be designated for accelerated performance based on the determination, and the operations of the computing systems may be performed. A first operation not designated for accelerated performance may include first computations corresponding to the first operation after waiting for a synchronization delay period, and a second operation designated for accelerated performance may include second computations corresponding to the second operation and performed without waiting for the synchronization delay period.

18 Claims, 6 Drawing Sheets

SYSTEM AND METHOD OF COMPUTATION ACCELERATION FOR AUTONOMOUS DRIVING SYSTEMS

CROSS-REFERENCE TO RELATED APPLICATIONS

This application claims the benefit of U.S. Patent Application Ser. No. 63/257,531, filed on Oct. 19, 2021, and U.S. Patent Application Ser. No. 63/366,738, filed on Jun. 21, 2022; the disclosures of which are incorporated herein by reference in their entireties.

FIELD OF THE INVENTION

The present disclosure generally relates to a system and method of computation acceleration for autonomous driving systems.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes identifying one or more computing systems corresponding to an autonomous vehicle (AV), wherein each computing system is configured to perform at least one operation of one or more operations relating to driving of the AV. The method may include determining, for each of the computing systems, whether the computing systems use a first respective real-world parameter as an input to at least one of the operations or generate a second respective real-world parameter as an output of the at least one operation. The method may include designating a respective operation corresponding to a respective computing system of the one or more computing systems for accelerated performance responsive to determining that the respective operation corresponding to the respective computing system does not use a respective third real-world parameter as the input or generate a fourth respective real-world parameter as the output and performing the operations of the computing systems. A first operation not designated for accelerated performance may include one or more first computations corresponding to the first operation after waiting for a synchronization delay period, and a second operation designated for accelerated performance may include one or more second computations corresponding to the second operation and performed without waiting for the synchronization delay period.

In some embodiments, the first respective real-world parameter may include at least one of: one or more dimensions of the AV, a location of the AV, a speed of the AV, a turning position of the AV, and locations of one or more objects in the vicinity of the AV.

In some embodiments, the operations relating to driving of the AV may include a status update phase, a world update phase, a decision planning phase, and a control target update phase. The identified computing systems may include a grading system configured to obtain and evaluate the AV based on computational results output during the status update phase. In some embodiments, the identified computing systems may include a map service system and a routing system in which the map service system is configured to determine one or more parameters associated with a world map that represents an environment in which the AV is driving generated during the world update phase and the routing system is configured to determine a route for the AV to travel from a starting point to a destination, the decision planning phase performing one or more of the operations based on the determined route. In some embodiments, one or more first operations may be associated with the status update phase, one or more second operations associated with the world update phase, or one or more third operations associated with the control target update phase are not designated for accelerated performance. One or more fourth operations may be associated with the decision planning phase, one or more fifth operations associated with the grading system, one or more sixth operations associated with the map service system, or one or more seventh operations associated with the routing system are designated for accelerated performance.

In some embodiments, accelerating performance of the operations designated for accelerated performance may include removing the synchronization delay period associated with the operations designated for accelerated performance. The synchronization delay period associated with a given operation may be equal to an amount of time ranging from an amount of time spent performing the given operation and one million times the amount of time spent performing the given operation.

One or more embodiments of the present disclosure may include one or more non-transitory computer-readable storage media configured to store instructions that, in response to being executed, cause a system to perform operations. The operations may include identifying one or more computing systems corresponding to an autonomous vehicle (AV), wherein each computing system is configured to perform at least one operation of one or more operations relating to driving of the AV. The operations may include determining, for each of the computing systems, whether the computing systems use a first respective real-world parameter as an input to at least one of the operations or generate a second respective real-world parameter as an output of the at least one operation. The operations may include designating a respective operation corresponding to a respective computing system of the one or more computing systems for accelerated performance responsive to determining that the respective operation corresponding to the respective computing system does not use a respective third real-world parameter as the input or generate a fourth respective real-world parameter as the output and performing the operations of the computing systems. A first operation not designated for accelerated performance may include one or more first computations corresponding to the first operation after waiting for a synchronization delay period, and a second operation designated for accelerated performance may include one or more second computations corresponding to the second operation and performed without waiting for the synchronization delay period.

In some embodiments, the first respective real-world parameter may include at least one of: one or more dimensions of the AV, a location of the AV, a speed of the AV, a turning position of the AV, and locations of one or more objects in the vicinity of the AV.

In some embodiments, the operations relating to driving of the AV may include a status update phase, a world update phase, a decision planning phase, and a control target update phase. The identified computing systems may include a grading system configured to obtain and evaluate the AV based on computational results output during the status update phase. In some embodiments, the identified computing systems may include a map service system and a routing system in which the map service system is configured to determine one or more parameters associated with a world map that represents an environment in which the AV is driving generated during the world update phase and the routing system is configured to determine a route for the AV to travel from a starting point to a destination, the decision planning phase performing one or more of the operations based on the determined route.

In some embodiments, one or more first operations may be associated with the status update phase, one or more second operations associated with the world update phase, or one or more third operations associated with the control target update phase are not designated for accelerated performance. One or more fourth operations may be associated with the decision planning phase, one or more fifth operations associated with the grading system, one or more sixth operations associated with the map service system, or one or more seventh operations associated with the routing system are designated for accelerated performance.

In some embodiments, accelerating performance of the operations designated for accelerated performance may include removing the synchronization delay period associated with the operations designated for accelerated performance. The synchronization delay period associated with a given operation may be equal to an amount of time ranging from an amount of time spent performing the given operation and one million times the amount of time spent performing the given operation.

One or more embodiments of the present disclosure may include a system that includes one or more processors and one or more non-transitory computer-readable storage media configured to store instructions that, in response to being executed, cause the system to perform operations. The operations may include identifying one or more computing systems corresponding to an autonomous vehicle (AV), wherein each computing system is configured to perform at least one operation of one or more operations relating to driving of the AV. The operations may include determining, for each of the computing systems, whether the computing systems use a first respective real-world parameter as an input to at least one of the operations or generate a second respective real-world parameter as an output of the at least one operation. The operations may include designating a respective operation corresponding to a respective computing system of the one or more computing systems for accelerated performance responsive to determining that the respective operation corresponding to the respective computing system does not use a respective third real-world parameter as the input or generate a fourth respective real-world parameter as the output and performing the operations of the computing systems in which a first operation not designated for accelerated performance includes one or more first computations corresponding to the first operation after waiting for a synchronization delay period and a second operation designated for accelerated performance includes one or more second computations corresponding to the second operation and performed without waiting for the synchronization delay period.

In some embodiments, the operations relating to driving of the AV include a status update phase, a world update phase, a decision planning phase, and a control target update phase. The identified computing systems may include a grading system configured to obtain and evaluate the AV based on computational results output during the status update phase. The identified computing systems include a map service system and a routing system in which the map service system is configured to determine one or more parameters associated with a world map that represents an environment in which the AV is driving generated during the world update phase and the routing system is configured to determine a route for the AV to travel from a starting point to a destination, the decision planning phase performing one or more of the operations based on the determined route.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

An autonomous vehicle (AV) may perform computations corresponding to a variety of computing systems associated with the AV, such as environmental perception systems, AV localization systems, and/or operations control systems, to simulate and/or perform operations of the AV. In some embodiments, the computing systems associated with the AV may perform computations at a given refresh rate that may or may not be based on changes in the real world. For example, a computing system associated with a given environmental perception system may be capable of capturing and/or processing sensor data from the surrounding environment around an associated AV at a refresh rate of one hundred hertz, but the surrounding environment and/or the physical capabilities of the sensor may only update (e.g., objects move, the AV moves, a LiDAR senses surroundings, etc.) at a rate effectively equivalent to ten hertz in real time. In this and other examples, computational performance by the computing system of the AV (the given environmental perception system) may or may not be limited by the real-time refresh rate rather than the refresh rate of the computing hardware. By contrast, other computing systems, such as an operations control system, may be configured to process information and/or perform computations at the refresh rate of the computing system (e.g., are only limited by the computing capabilities of the computing system) because computations of such computing systems may or may not be performed based on information captured in real time. Because computing systems of the AV may operate at different refresh rates and based on different pieces of information, operations of a first computing system (e.g., the operations control system) may be throttled by performance of a second computing system that performs computations directly based on real-world information (e.g., from the environmental perception system).

Because multiple different computing systems may interactively and/or cooperatively perform computations that relate to driving operations of the AV, existing autonomous driving systems used with AVs may introduce a synchronization delay period after performing one or more computations. For example, an existing autonomous driving system may perform a first computation relating to driving operations of a given AV, such as predicting one or more trajectories of objects in the vicinity of the given AV, and delay performance of a second computation, such as planning a projected movement path of the given AV, for a period of time. After performing the second computation, the existing autonomous driving system may introduce another synchronization delay period that may be the same as or different from the period of time between the first computation and the second computation. In this and other examples, the existing autonomous driving system may use the synchronization delay period to facilitate alignment of computations and/or prevent synchronization issues associated with real-world inputs that may or may not be relevant to given computations.

Performing computations as described above with respect to the existing autonomous driving systems may result in significant downtime between computations that ultimately increase the amount of time used to control and actuate driving operations of the AV. Because of the computational time needed to drive the AV when using the existing autonomous driving systems, less time and/or computing resources may be available for performing some computations or processes. For example, existing autonomous driving systems may have little time available and/or few computing resources available for performing real-time simulations of planned driving operations.

The present disclosure relates to, among other things, accelerating performance of computations performed by one or more computing systems corresponding to driving operations of the AV. In some embodiments, the computing systems associated with the AV may be reviewed to determine what input information is used by each of the computing systems and what outputs are generated by each of the computing systems. Based on the inputs and the outputs of each computing system, computations of the computing systems may be performed autonomously at an accelerated rate (e.g., at a rate closer to the refresh rate of the computing hardware). As such, a computation acceleration system according to the present disclosure may improve the efficiency and/or autonomy of operations of computing systems associated with AVs. For example, computing systems that perform operations based on real-world data (such as sensor data that is to be captured in real-time) may operate at speeds based on the rate of received data (e.g., sensed data), while other computing systems that do not use data dependent on passing time may be performed at a speed limited by the computing resources available, and not the rate at which data is generated. While described as separate "computing systems," it will be appreciated that a single physical computing device (such as a computing system within an AV) may operate to perform all the functions described herein. In these and other embodiments, the allocation of computing resources may be adjusted such that some of the computing resources perform the operations constrained by the temporal generation of data (such as sensor data) and other computing resources perform the operations unconstrained by the temporal generation of data.

Additionally or alternatively, simulations of complex and/or life-critical computation systems for an AV may be repeated autonomously to ensure consistency and/or accuracy of the simulations relative to corresponding real-world computations performed by the complex and/or life-critical computation systems. In some situations, a given operation may be considered life-critical if an output of the given operation is important for maintaining the safety of one or more human users and/or property. Additionally or alternatively, the given operation may be considered life-critical if completion of the given operation within a given period of time is important for maintaining the safety of human users and/or property. However, repeated simulations of the same computing system and/or simulations of autonomous driving systems at a large scale (e.g., a fleet of AVs) may be computationally demanding due to the large volume and/or complexity of the computations. As such, accelerating performance of computations according to the present disclosure may facilitate efficient performance of multiple simulations of one or more computing systems corresponding to an autonomous driving system and/or simulations of multiple complex and/or life-critical computation systems for autonomous driving.

Embodiments of the present disclosure will be explained with reference to the accompanying drawings.

Figure 1:
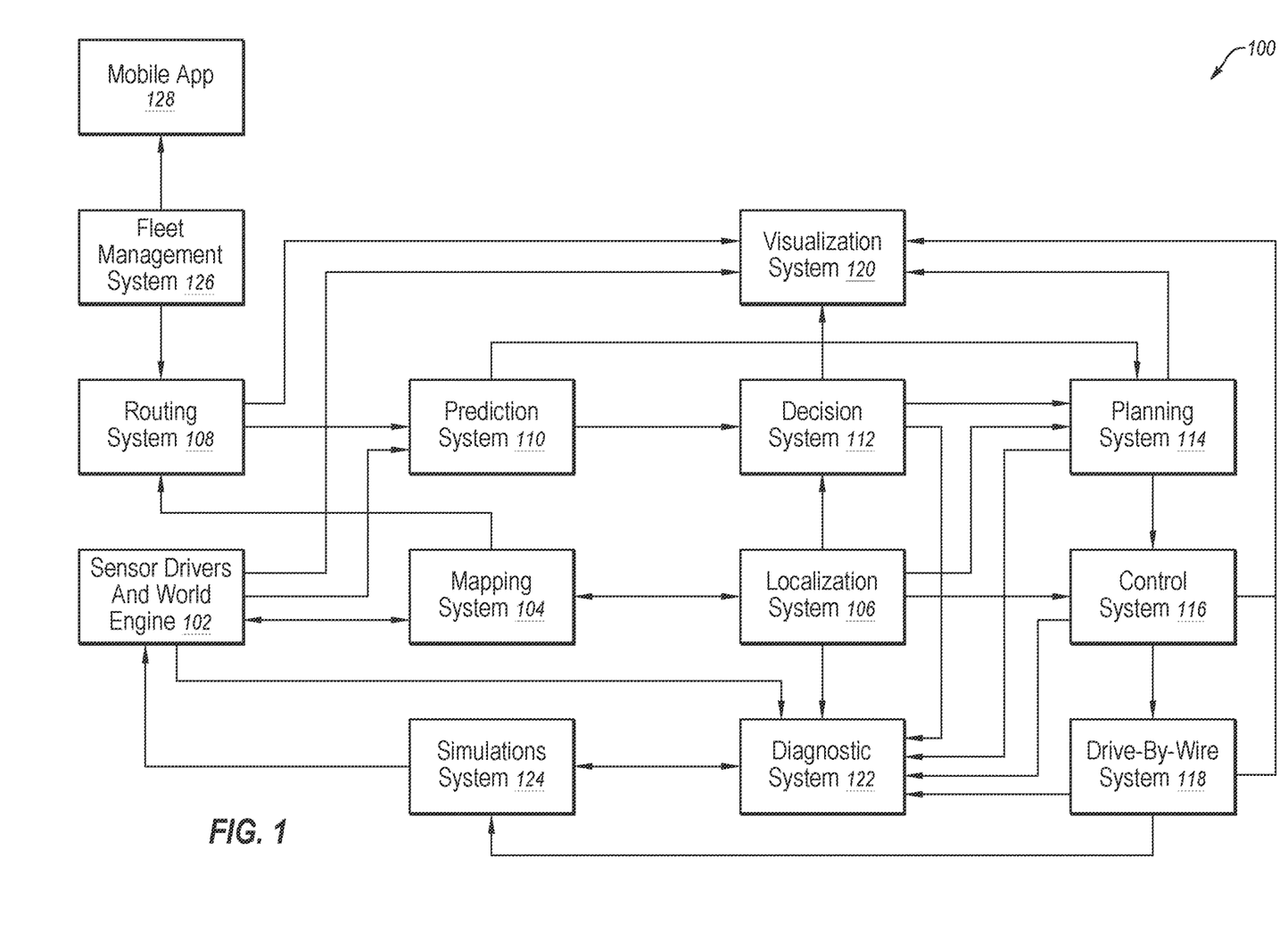
FIG. 1 illustrates an example embodiment of an autonomous driving system 100 according to at least one embodiment of the present disclosure.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control commands that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control commands implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and the mobile app 128 are delineated in the specific manner described to help with explaining concepts described herein but such delineation is not meant to be limiting. Further, the autonomous driving system 100 may include any number of other elements or may be implemented within other systems or contexts than those described.

Figure 2A:
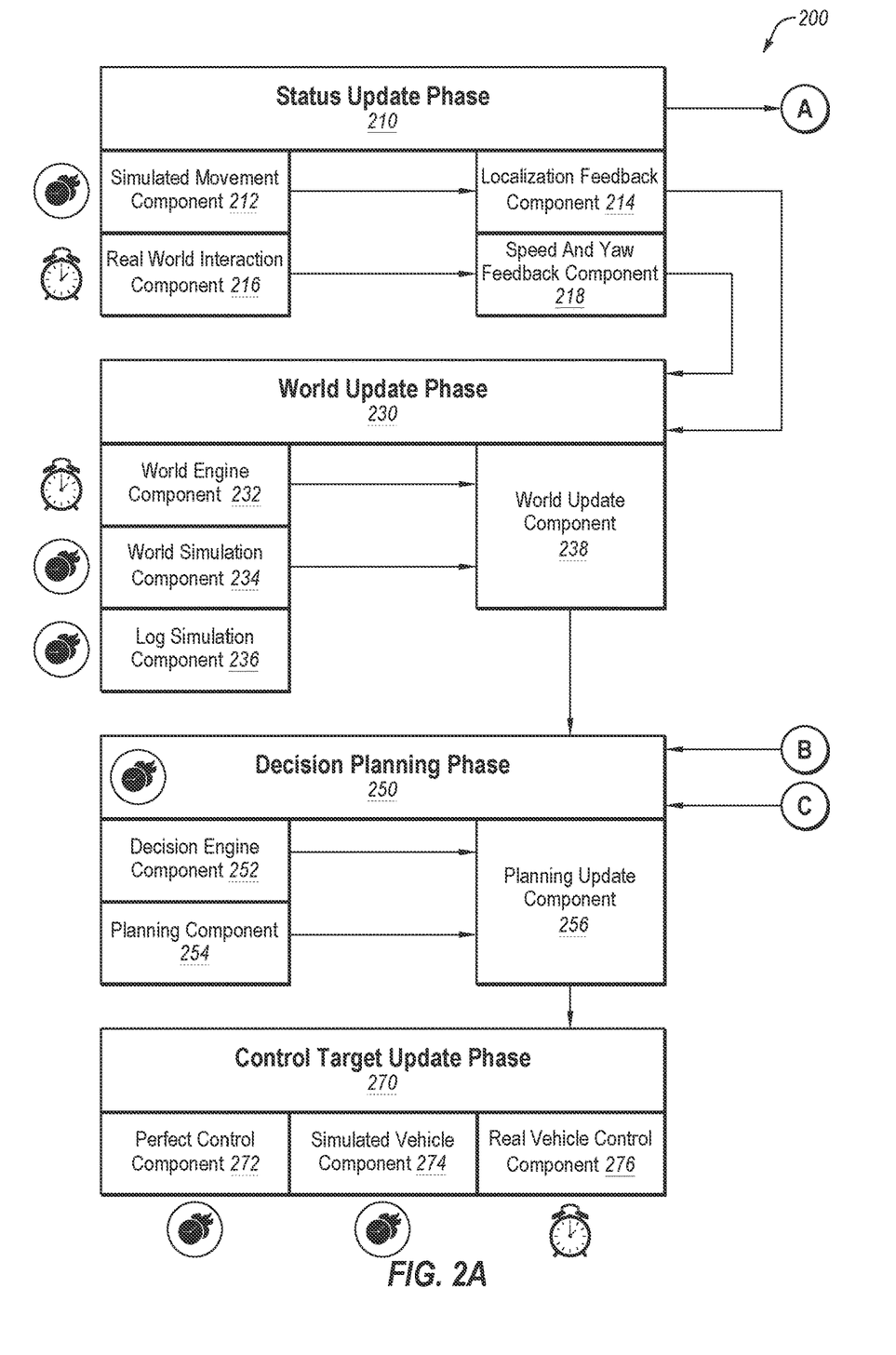
FIGS. 2A and 2B illustrate an example computation acceleration system according to the present disclosure.
Figure 2B:
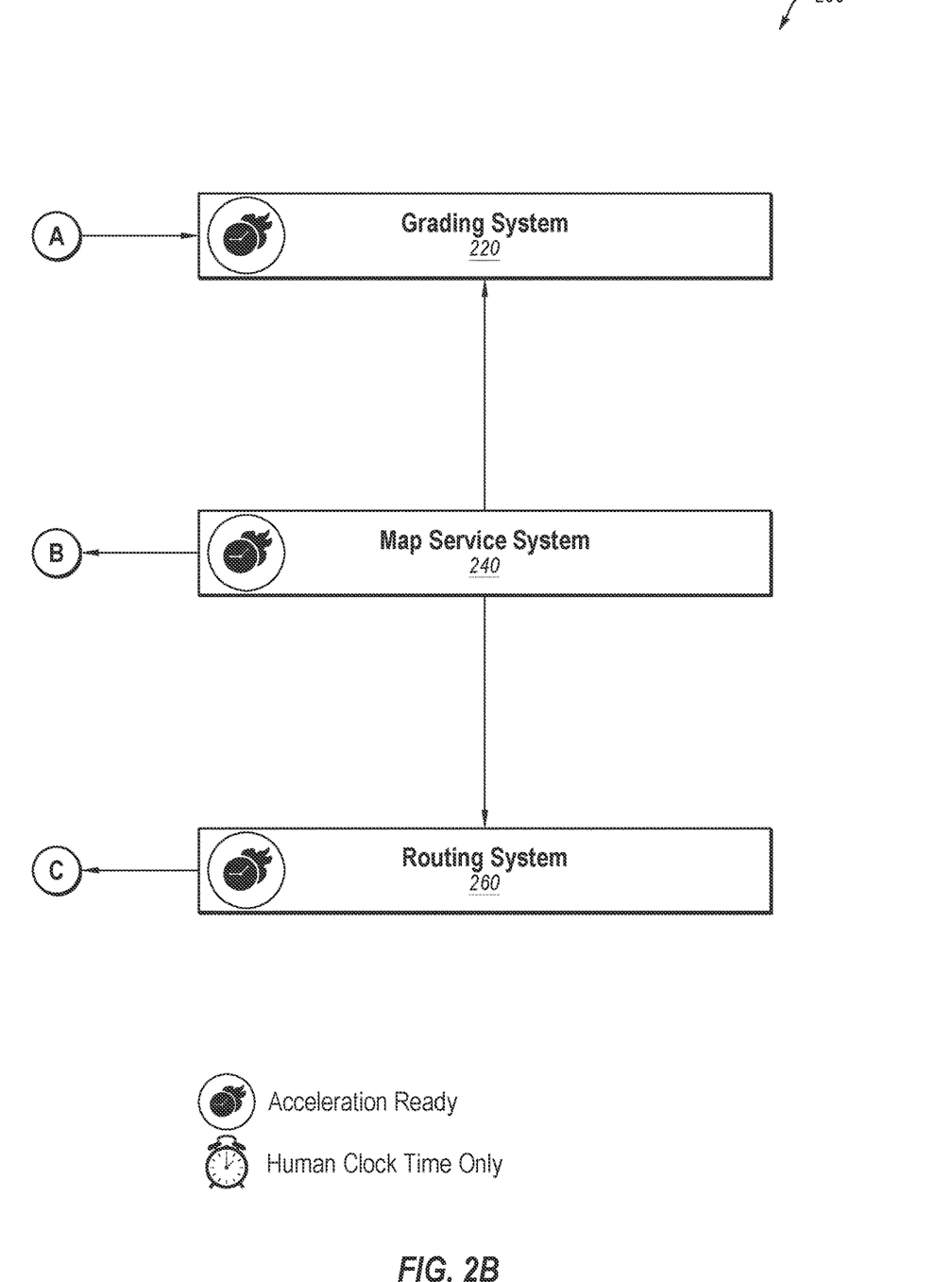

FIGS. 2A and 2B illustrate an example computation acceleration system 200 according to the present disclosure. The computation acceleration system 200 may include one or more computing systems, such as computing systems configured to perform operations of a status update phase 210 (e.g., by a localization computing system), a world update phase 230 (e.g., by a mapping computing system), a decision planning phase 250 (e.g., by a decision-making computing system), a control target update phase 270 (e.g., by an operations control computing system), a grading system 220, a map service system 240, and/or a routing system 260, which may be the same as or similar to the computer systems involved with the autonomous driving system 100 of FIG. 1. Such designations of systems may be conceptual rather than physical in nature (e.g., a single physical computing device may perform some or all of the actions attributable to the various systems illustrated in FIGS. 2A and 2B). In these and other embodiments, each of the computing systems may be configured to perform computations that may be categorized as acceleration-ready computations, which may be accelerated, or as human-clock computations, which may not be accelerated. Additionally or alternatively, some computing systems may perform some computations that are acceleration-ready and other computations that are human-clock (e.g., they may be hybrid systems that have a mix of computations).

In some embodiments, accelerating computations of the AV computing systems may include increasing the rate at which the acceleration-ready computations are performed relative to a human-clock computation rate. For example, a localization system of an autonomous driving system may perform localization computations at a human-clock computation rate of ten hertz. In other words, the localization system may determine a location of the AV in a given environment ten times per second. Computing the location of the AV, however, may occur more quickly than the allotted time for each given cycle. In this and other examples, the localization system may determine the location of the AV in less time than 0.1 seconds for a given cycle. Consequently, the localization system may wait for a synchronization delay period equal to the difference between the time taken for a given computation cycle (e.g., 0.1 seconds) and the time taken to localize the AV.

In some situations, the localization system may be configured to simulate movement and/or localization of the AV to improve the accuracy and reliability of the computations performed by the localization system. In these and other situations, the computations corresponding to the simulated movement and/or the simulated localization of the AV may be performed at a rate faster than the human-clock computation rate because simulating the movement and/or localization of the AV may not rely on the captured real world sensor data. As such, computations relating to movement simulation and/or localization simulation corresponding to the movement simulations may be performed more frequently, autonomously (e.g., the same simulated computation may be performed ten, fifty, one hundred, etc. times to ensure accuracy), and/or at an accelerated rate upwards of the performance limits of the computing hardware (e.g., CPU processing speeding) of the localization system. In these and other embodiments, such simulations may be supplemented or updated with real-world data as it becomes available, while still allowing for accelerated calculations and processing.

In some embodiments, the computation acceleration system 200 may determine whether a given AV computing system performs computations using real-world parameters as a direct input to the computations and/or generates real-world parameters as a direct output of the computations. The computation acceleration system may accelerate operations of the given AV computing system responsive to and/or based on determining that the given AV computing system performs computations that do not rely on real-world parameters as computational inputs. For example, the mapping system of the AV may perform computations related to generating a map of an environment surrounding the AV, which may or may not be determined based on sensor data of the real-world environment around the AV (e.g., topographical features, distances to objects, object geometries, ambient lighting conditions, weather conditions, etc.). The mapping system may also perform computations related to simulating an updated map based on, for example, simulated movement and/or simulated localization of the AV. Because the map-generation computations may use real-world sensor data as their inputs, the map-generation computations may not be accelerated by the computation acceleration system but instead may continue to perform computations consistent with the rate of real-world data acquisition. In contrast, the computations related to simulating map updates may include computations that do not rely on real-world parameters (e.g., simulating virtual scenarios via world-simulation and/or simulating scenarios based on logged data via log-simulation). As such, the computations related to simulating map updates may be performed at a faster rate and/or more frequently than the map-generation computations. In some embodiments, such accelerated computations may be performed twice as fast, three times as fast, or one or more orders of magnitude as fast as computations limited by real-world data acquisition.

In some embodiments, AV operations may begin with a status update phase 210 that may include performing one or more computations corresponding to the localization system. For example, the status update phase 210 may include obtaining sensor data (e.g., by the localization system) that describe real world interactions associated with a real world interaction component 216 and determine the speed and/or the yaw of the AV via computations performed at the human-clock computation rate associated with a speed and yaw feedback component 218. Based on the determined speed and/or yaw of the AV, the localization system and/or any other computing systems may provide feedback regarding speed and/or orientation (e.g., yaw feedback) of the AV. Additionally or alternatively, the status update phase 210 may include computing a location and/or an orientation of the AV based on the determined speed of the AV, the determined yaw of the AV, and/or any other sensor data corresponding to the AV (e.g., GPS location data). During the status update phase 210, the localization system may simulate movement of the AV associated with a simulated movement component 212 and provide localization feedback responsive to the simulated movement of the AV associated with a localization feedback component 214. Because computations relating to simulating movement of the AV and providing localization feedback according to the simulated movement may not rely on real-world parameters, the computations of the simulated movement component 212 and/or the localization feedback component 214 may be performed at an accelerated rate without any synchronization delay periods between computation cycles. Additionally or alternatively, the computations of the simulated movement component 212 and/or the localization feedback component 214 may be performed at a human-clock computation rate responsive to determining that the computations rely on real-world sensor data.

In some embodiments, computational results output during the status update phase 210 may be sent to the grading system 220, which may be configured to assess a safety of the AV based on the information output during the status update phase 210 and/or whether the updated status of the AV as determined during the status update phase 210 facilitates effective driving of the AV towards a destination of the AV. The grading system 220 may evaluate the updated status of the AV with respect to one or more rules, such as traffic rules, driving operation logical rules, and/or any other criteria, and assign a grade for the updated status of the AV. In these and other embodiments, computations performed by the grading system 220 may be designated for accelerated computation because the grading system 220 may not rely on real-world parameters to perform its computations. Thus, the grading system 220 may assess the updated status of the AV according to one or more criteria at an accelerated computational rate. Additionally or alternatively, the grading system 220 may obtain real-world parameters as inputs such that the computations of the grading system 220 are performed at a human-clock computational rate.

The speed feedback, the orientation feedback, the localization feedback, the yaw feedback, and/or any other information from the status update phase 210 may be used during a world update phase 230. The world update phase 230 may include performing computations using the mapping system to generate one or more world updates that describe an environment around the AV in a world update component 238. In some embodiments, the mapping system of the AV may perform computations related to generating a map of the environment surrounding the AV based on sensor data of the real-world environment around the AV and/or the feedback received from the status update phase 210. As described above, such map-generation computations may be performed at the human-clock computation rate because the computations are performed using real-world sensor data of the environment and/or objects around the AV in a world engine component 232. While described as being performed at the human-clock computation rate, it will be appreciated that in some circumstances, such as when the map-generation computations are not utilizing real-world sensor data, the computations may be performed in an accelerated manner.

Additionally or alternatively, the mapping system may perform computations related to simulating an updated world at an accelerated computation rate. In some embodiments, the updated world may include a simulated change in the world based on the simulated movement of the AV. For example, the simulated change in the world may include shifting a focal point of a map corresponding to the world forward by ten meters in response to receiving simulated movement of the AV forward by ten meters. In these and other embodiments, the simulated map may be generated according to a world-simulation approach based on information included in a group of autonomous driving scenarios in a world simulation component 234. The world simulation component 234 may include simulating a map for a given simulation scenario (e.g., a scenario as dictated by the simulated movement of the AV from the status update phase 210) in which the simulated map may be generated based on previously captured and/or computed characteristics of the environment in an autonomous driving system ("ADS") data storage. Additionally or alternatively, the simulated map may be generated according to a log-simulation approach in association with a log simulation component 236 in which previously recorded sensor data relating to the environment of the AV (including objects in the vicinity of the AV) and/or information about movement of the AV (e.g., "logged" information relating to the AV and its environment) may be used to generate the world update of the world update phase 230.

The world update may be obtained by the decision-making system and used to determine one or more planning decisions for the AV during a decision planning phase 250. In some embodiments, the decision planning phase 250 may include obtaining, by the decision-making system, information relevant to planning operations of the AV. For example, the decision-making system may obtain the world update from the world update phase 238, mapping information from the map service system, one or more planned routes from the routing system, and/or any other pieces of relevant information. The decision-making system may include a decision engine component 252 and/or a planning engine component 254 that analyze the obtained information and generate one or more planning decisions regarding operations of the AV in a planning update component 256.

In these and other embodiments, the decision-making system may perform computations at an accelerated computation rate because the decision-making system may perform computations with or without directly referencing real-world parameters. The decision-making system may obtain mapping information from the map-generation system and/or a map service system 240. Additionally or alternatively, the decision-making system may obtain one or more planned routes from the routing system along with the mapping information to determine one or more decisions regarding operations of the AV. As such, the computations of the decision-making system during the decision planning phase 250 may be accelerated because the decision-making system may not reference information pertaining to the real world captured in real time to generate the planning decisions. While described as being performed at an accelerated computation rate, it will be appreciated that in some circumstances, such as when the decision-making computations utilize real-world sensor data, the computations may be performed at a human-clock computation rate.

The planning decisions generated by the decision-making system may be obtained by the operations control system during a control target update phase 270. In some embodiments, the control target update phase 270 may involve generating one or more driving signals to facilitate implementation of the planning decisions from the decision-making system. In these and other embodiments, the control target update phase 270 may include a real vehicle control component 276 that is informed by a perfect control component 272 and/or a simulated vehicle component 274. The perfect control component 272 may involve simplified modeling of movement of the AV in response to the planning decisions output in the decision planning phase 250 with or without consideration of physical constraints associated with movement of the AV. For example, a given planning decision may indicate that a given AV at rest should drive forward ten meters at a given speed. The perfect control component 272 may model movement of the given AV forward by ten meters with or without consideration for acceleration, deceleration, or any other real-world physical constraints.

The perfect control component 272 may model simplified movement of the given AV with consideration for timing and positioning. The simulated vehicle component 274 may simulate movement of the given AV with consideration for physical constraints that may or may not affect the given AV and/or the environment in which the given AV operates. For example, the simulated vehicle component 274 may simulate movement of the given AV while factoring the time needed for the given AV to accelerate to a given speed, how objects in the vicinity of the given AV may behave during travel, deceleration of the given AV as it approaches its destination, some combination thereof, or any other real-world phenomena that may or may not affect the given AV during operation.

Computations involving the perfect control component 272 and/or the simulated vehicle component 274 may be performed at an accelerated computation rate because the computations may not involve obtaining and/or outputting real-world parameters. For example, testing the driving signals generated by the operations control system in a perfect-control environment (e.g., a virtual environment) may not require real-world interactions. As such, testing the driving signals in the perfect-control environment may be achieved at an accelerated rate. As another example, implementing the driving signals in a simulated vehicle model may similarly not require real-world interactions, which may facilitate performing accelerated computations. Conversely, the real vehicle control component 276 may be performed at a human-clock computational rate because a control signal output by the real vehicle control component 276 may be used to affect control of the AV in the real world rather than in a simulated and/or a computational environment. As such, computations relating to driving-signal analysis may be performed at the human-clock computation rate.

In some embodiments, the map service system 240 and/or a routing system 260 may compute one or more parameters relevant to operations of the AV in parallel with the processes of the state update phase 210, the world update phase 230, the decision planning phase 250, and/or the control target update phase 270. For example, the map service system 240 may determine one or more parameters associated with the world map generated by the mapping system and/or world updates generated during the world update phase 230, which may provide additional information on which the decision-making system may base the planning decisions. Additionally or alternatively, the map service system 240 may send the parameters associated with the world map to the grading system 220 to ensure the grading system 220 uses the most recent and/or accurate map parameters to assess the computations of the status update phase 210. Additionally or alternatively, the routing system 260 may obtain information from the map service system 240 and/or the mapping system to identify one or more planned routes for the AV to travel from a given starting point to a destination, which may be referenced in determining the planning decisions during the decision planning phase 250.

In some embodiments, the grading system 220, the map service system 240, and/or the routing system 260 may each be configured to perform computations at an accelerated rate because the grading system 220, the map service system 240, and/or the routing system 260 perform computations with respect to other computational results. For example, the grading system 220 may obtain information regarding the simulated movement and/or localization of the AV and/or information that describes the environment in which the AV is operating (e.g., via the map service system 240) to output a grading summary that describes how effective the simulated movement of the AV is with respect to one or more rules. As another example, the routing system 260 may obtain map information from the map service system 240 and calculate one or more routes for a given AV to take to arrive at a given destination from a given starting point. Because computations corresponding to the grading system 220, the map service system 240, and/or the routing system 260 may not rely on real-world parameters, the computations of the grading system 220, the map service system 240, and/or the routing system 260 may be accelerated.

In some embodiments, the computation acceleration system 200 may be implemented on board a given autonomous driving system, such as the autonomous driving system 100 of FIG. 1. For example, the computation acceleration system 200 may involve operations that are distributed to one or more computing modules, subsystems, and/or processes involved with the autonomous driving system 100 may be configured to perform. Additionally or alternatively, the computation acceleration system 200 may be implemented as a discrete computing system implemented with the autonomous driving system 100. Additionally or alternatively, the computation acceleration system 200 may be implemented as part of a cloud computing network communicatively coupled with a given autonomous driving system.

Modifications, additions, or omissions may be made to the computation acceleration system 200 without departing from the scope of the present disclosure. For example, the designations of different elements in the manner described is meant to help explain concepts described herein and is not limiting. For instance, in some embodiments, the status update phase 210, the world update phase 230, the decision planning phase 250, the control target update phase 270, the grading system 220, the map service system 240, and/or the routing system 260 are delineated in the specific manner described to help with explaining concepts described herein but such delineation is not meant to be limiting. Further, the computation acceleration system 200 may include any number of other elements or may be implemented within other systems or contexts than those described.

Figure 3A:
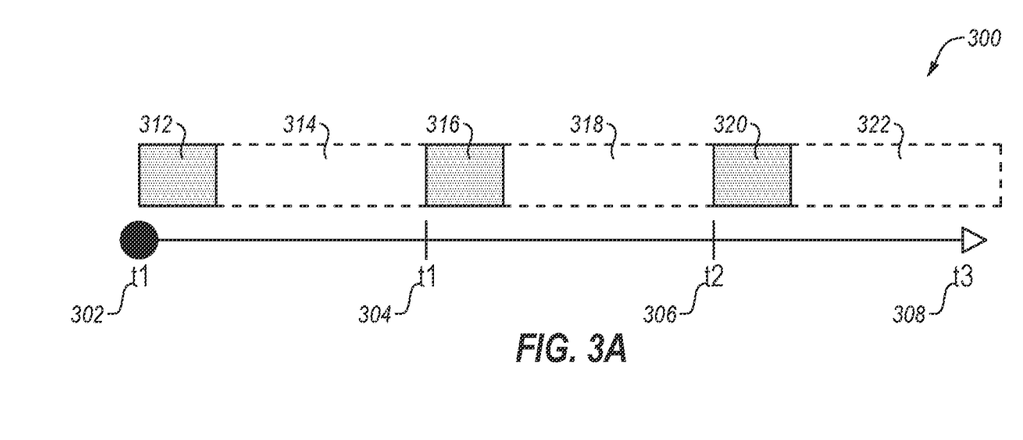
FIGS. 3A and 3B illustrate a comparison between computational processing for unaccelerated computing operations and accelerated computing operations.
Figure 3B:
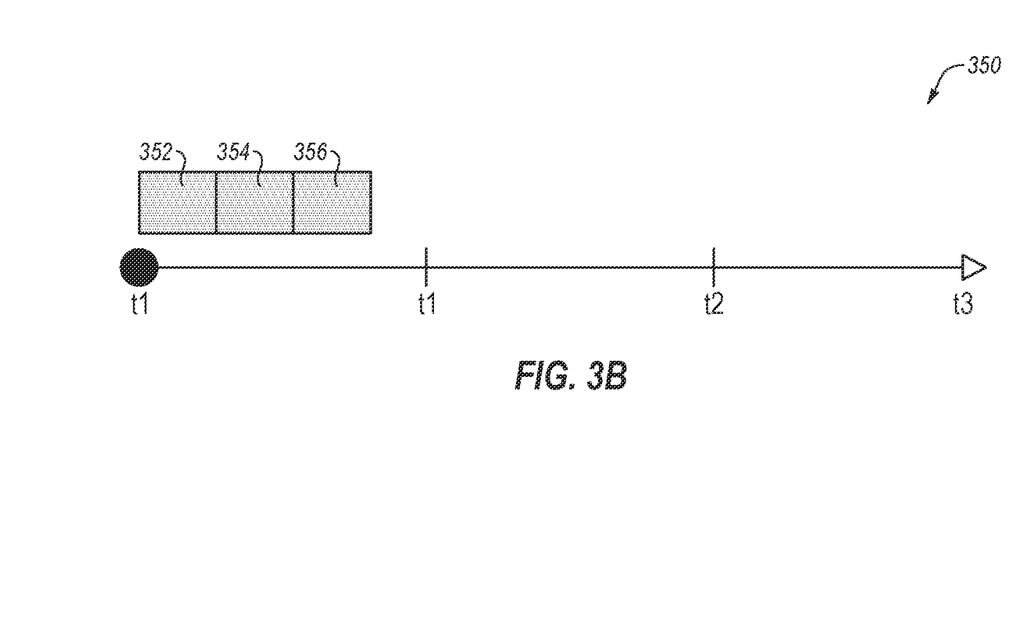

FIGS. 3A and 3B illustrate a comparison between computational processing for unaccelerated computing operations 300 and accelerated computing operations 350. The unaccelerated computing operations 300 may include a first computing task 312 scheduled to be performed at a first time 302, $t_0$; a second computing task 316 scheduled to be performed at a second time 304, $t_1$; and a third computing task 320 scheduled to be performed at a third time 306, $t_2$. In some situations, a first synchronization delay period 314 may be introduced after performance of the first computing task 312 in which the first synchronization delay period 314 lasts until the second time 304. Additionally or alternatively, a second synchronization delay period 318 may be introduced after performance of the second computing task 316 in which the second synchronization delay period 318 lasts until the third time 306. Additionally or alternatively, a third synchronization delay period 322 may be introduced after performance of the third computing task 320 in which the third synchronization delay period 322 lasts until a fourth time 308, $t_3$.

With computational acceleration, a first accelerated computing task 352 may be performed at the first time 302. A second accelerated computing task 354 may be performed immediately after performance of the first accelerated computing task 352 without any synchronization delay periods introduced after completion of the first accelerated computing task 352, and a third accelerated computing task 356 may be performed immediately after performance of the second accelerated computing task 354 without any synchronization delay periods introduced after completion of the second accelerated computing task 354. As a result of the computational acceleration process, computation of the first accelerated computing task 352, the second accelerated computing task 354, and the third accelerated computing task 356 may be completed more quickly than computation of the first computing task 312, the second computing task 316, and the third computing task 320 with or without changing an order in which the computing tasks are performed.

For example, as shown in FIG. 3A, the computing device may just sit idle during the first synchronization delay period until the second time 304 when the second computing task 316 may be started. In contrast, as shown in FIG. 3B, the computing tasks 352 and 354 may be performed in rapid succession with little, if any, delay between completing the computing task 352 and starting the computing task 354.

Figure 4:
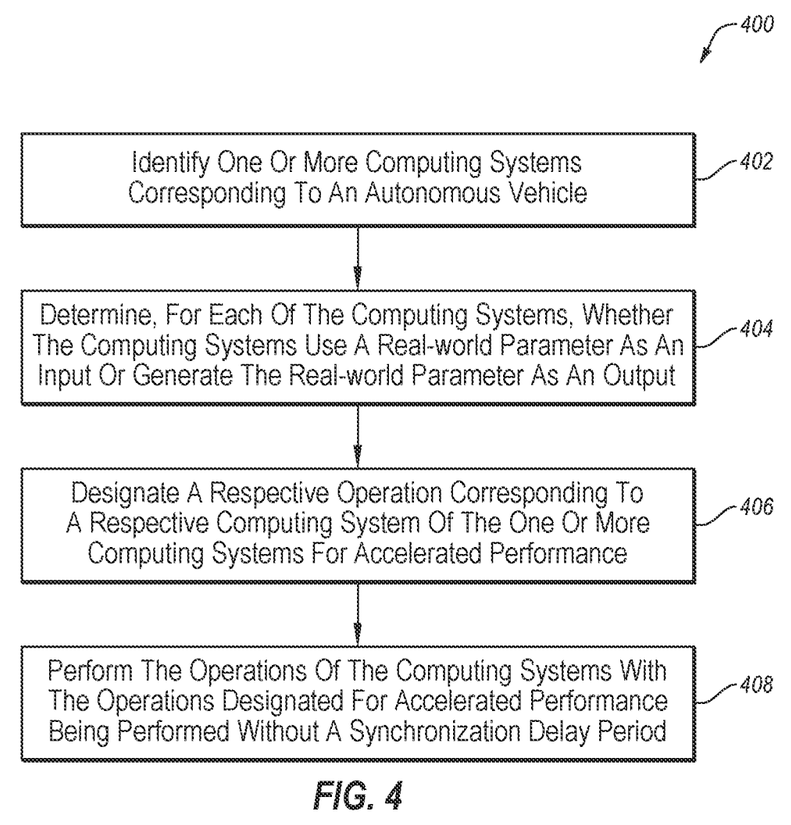
FIG. 4 is a flowchart of an example method of performing computational acceleration according to one or more embodiments of the present disclosure.

FIG. 4 is a flowchart of an example method 400 of performing computational acceleration according to one or more embodiments of the present disclosure. The method 400 may be performed by any suitable system, apparatus, or device. For example, the status update phase 210, the world update phase 230, the decision planning phase 250, the control target update phase 270, the grading system 220, the map service system 240, and/or the routing system 260 of FIGS. 2A and 2B may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where one or more computing systems corresponding to a given AV may be identified. The computing systems may each be configured to perform at least one operation relating to driving of the given AV. For example, the computing systems may include the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and/or the mobile app 128 as described in relation to the autonomous driving system 100 of FIG. 1. As an additional or alternative example, the computing systems may be configured to perform operations in relation to the status update phase 210, the world update phase 230, the decision planning phase 250, the control target update phase 270, the grading system 220, the map service system 240, and/or the routing system 260 as described in relation to the computation acceleration system 200 of FIGS. 2A and 2B.

At block 404, whether each of the computing systems uses a real-world parameter as an input to at least one of the operations of the computing system or generates the real-world parameter as an output of the at least one operations may be determined. In some embodiments, the real-world parameter may include one or more dimensions of the given AV, a location of the given AV, a speed of the given AV, a turning position of the given AV, locations of one or more objects in the vicinity of the given AV, some combination thereof, or any other parameters associated with physical properties of the given AV.

At block 406, a respective operation corresponding to a respective computing system may be designated for accelerated performance responsive to determining that the respective operation corresponding to the respective computing system does not use a respective real-world parameter as the input or generate the respective real-world parameter as the output. In some embodiments, operations that may be designated for accelerated performance may include one or more operations associated with the status update phase 210, the world update phase 230, the decision planning phase 250, the control target update phase 270, the grading system 220, the map service system 240, and/or the routing system 260 as described in relation to the computation acceleration system 200 of FIGS. 2A and 2B.

At block 408, the operations of the computing systems may be performed with the operations designated for accelerated performance being performed without a synchronization delay period. As illustrated in FIGS. 3A and 3B, performance of the operations of the computing systems in which some of the operations are designated for accelerated performance may result in an overall decrease in the time taken to perform the operations of the computing systems. In some embodiments, the synchronization delay period may include a length of time that is equal to an amount of time spent performing a given operation, twice the amount of time spent performing a given operation, ten times the amount of time spent performing a given operation, fifty times the amount of time spent performing a given operation, one hundred times the amount of time spent performing a given operation, two hundred times the amount of time spent performing a given operation, five hundred times the amount of time spent performing a given operation, one thousand times the amount of time spent performing a given operation, ten thousand times the amount of time spent performing a given operation, one hundred thousand times the amount of time spent performing a given operation, one million times the amount of time spent performing a given operation, or any other lengths of time. For example, computations associated with a given operation may be completed in 2 nanoseconds, and the given operation may be performed at an overall refresh rate of 100 Hz. In this and other examples, the time spent performing the given operation may include the 2 nanoseconds used for the computations and a synchronization delay period of approximately 0.01 seconds, which may or may not correspond to the overall refresh rate of the given operation.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Figure 5:
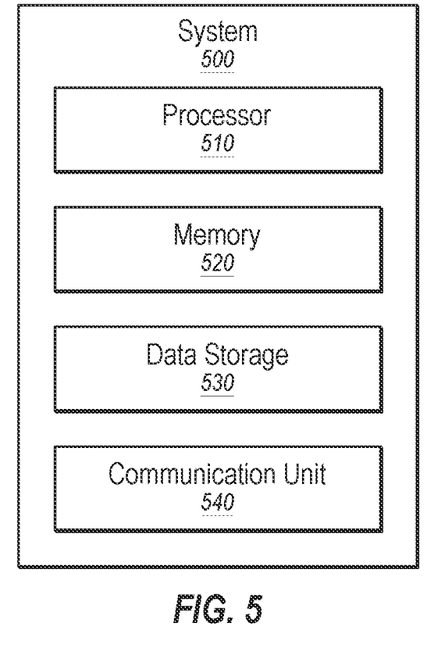
FIG. 5 is an example computing system.

FIG. 5 illustrates an example computing system 500, according to at least one embodiment described in the present disclosure. The computing system 500 may include a processor 510, a memory 520, a data storage 530, and/or a communication unit 540, which all may be communicatively coupled. Any or all of the computation acceleration system 200 of FIGS. 2A and 2B may be implemented as a computing system consistent with the computing system 500, including the status update phase 210, the world update phase 230, the decision planning phase 250, the control target update phase 270, the grading system 220, the map service system 240, and/or the routing system 260.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 5220, the processor 510 may execute the program instructions, such as instructions to perform operations associated with the status update phase 210, the world update phase 230, the decision planning phase 250, the control target update phase 270, the grading system 220, the map service system 240, and/or the routing system 260.

The memory 520 and the data storage 530 may include computer-readable storage media or one or more computer-readable storage mediums for having computer-executable instructions or data structures stored thereon. Such computer-readable storage media may be any available media that may be accessed by a general-purpose or special-purpose computer, such as the processor 510. For example, the memory 520 and/or the data storage 530 may store one or more of the computation results determined by the status update phase 210, the world update phase 230, the decision planning phase 250, the control target update phase 270, the grading system 220, the map service system 240, and/or the routing system 260. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

One skilled in the art, after reviewing this disclosure, may recognize that modifications, additions, or omissions may be made to the system 500 without departing from the scope of the present disclosure. For example, the system 500 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   identifying one or more computing systems corresponding to an autonomous vehicle (AV), wherein each computing system is configured to perform at least one operation of one or more operations relating to driving of the AV;
   determining, for each of the computing systems, whether the computing systems use a first respective real-world parameter as an input to at least one of the operations or generate a second respective real-world parameter as an output of the at least one operation;
   designating a respective operation corresponding to a respective computing system of the one or more computing systems for accelerated performance responsive to determining that the respective operation corresponding to the respective computing system does not use a respective third real-world parameter as the input or generate a fourth respective real-world parameter as the output; and
   performing a first operation and a second operation of the computing systems, wherein:
   the first operation not designated for accelerated performance includes one or more first computations corresponding to the first operation and is performed after waiting for a particular time period; and
   the second operation designated for accelerated performance includes one or more second computations corresponding to the second operation and is performed without waiting for the particular time period.

2. The method of claim 1, wherein the first respective real-world parameter includes at least one of: one or more dimensions of the AV, a location of the AV, a speed of the AV, a turning position of the AV, and locations of one or more objects in a vicinity of the AV.

3. The method of claim 1, wherein the operations relating to driving of the AV include a status update phase, a world update phase, a decision planning phase, and a control target update phase.

4. The method of claim 3, wherein the identified computing systems include a grading system configured to obtain and evaluate computational results output during the status update phase associated with operations of the AV.

5. The method of claim 4, wherein the identified computing systems include a map service system and a routing system, wherein:
the map service system is configured to determine one or more parameters associated with a world map that represents an environment in which the AV is driving generated during the world update phase; and
the routing system is configured to determine a route for the AV to travel from a starting point to a destination, the decision planning phase performing one or more of the operations based on the determined route.

6. The method of claim 5, wherein:
one or more first operations associated with the status update phase, one or more second operations associated with the world update phase, or one or more third operations associated with the control target update phase are not designated for accelerated performance; and
one or more fourth operations associated with the decision planning phase, one or more fifth operations associated with the grading system, one or more sixth operations associated with the map service system, or one or more seventh operations associated with the routing system are designated for accelerated performance.

7. The method of claim 1, wherein the particular time period associated with the first operation is equal to an amount of time ranging from an amount of time spent performing the given operation and one million times the amount of time spent performing the given operation.

8. One or more non-transitory computer-readable storage media configured to store instructions that, in response to being executed, cause a system to perform operations, the operations comprising:
identifying one or more computing systems corresponding to an autonomous vehicle (AV), wherein each computing system is configured to perform at least one operation of one or more operations relating to driving of the AV;
determining, for each of the computing systems, whether the computing systems use a first respective real-world parameter as an input to at least one of the operations or generate a second respective real-world parameter as an output of the at least one operation;
designating a respective operation corresponding to a respective computing system of the one or more computing systems for accelerated performance responsive to determining that the respective operation corresponding to the respective computing system does not use a respective third real-world parameter as the input or generate a fourth respective real-world parameter as the output; and
performing a first operation and a second operation of the computing systems, wherein:
the first operation not designated for accelerated performance includes one or more first computations corresponding to the first operation and is performed after waiting for a particular time period; and
the second operation designated for accelerated performance includes one or more second computations corresponding to the second operation and is performed without waiting for the particular time period.

9. The one or more non-transitory computer-readable storage media of claim 8, wherein the first respective real-world parameter includes at least one of: one or more dimensions of the AV, a location of the AV, a speed of the AV, a turning position of the AV, and locations of one or more objects in a vicinity of the AV.

10. The one or more non-transitory computer-readable storage media of claim 8, wherein the operations relating to driving of the AV include a status update phase, a world update phase, a decision planning phase, and a control target update phase.

11. The one or more non-transitory computer-readable storage media of claim 10, wherein the identified computing systems include a grading system configured to obtain and evaluate computational results output during the status update phase associated with operations of the AV.

12. The one or more non-transitory computer-readable storage media of claim 11, wherein the identified computing systems include a map service system and a routing system, wherein:
the map service system is configured to determine one or more parameters associated with a world map that represents an environment in which the AV is driving generated during the world update phase; and
the routing system is configured to determine a route for the AV to travel from a starting point to a destination, the decision planning phase performing one or more of the operations based on the determined route.

13. The one or more non-transitory computer-readable storage media of claim 12, wherein:
one or more first operations associated with the status update phase, one or more second operations associated with the world update phase, or one or more third operations associated with the control target update phase are not designated for accelerated performance; and
one or more fourth operations associated with the decision planning phase, one or more fifth operations associated with the grading system, one or more sixth operations associated with the map service system, or one or more seventh operations associated with the routing system are designated for accelerated performance.

14. The one or more non-transitory computer-readable storage media of claim 8, wherein the particular time period associated with the first operation is equal to an amount of time ranging from an amount of time spent performing the given operation and one million times the amount of time spent performing the given operation.

15. A system, comprising:
one or more processors; and
one or more non-transitory computer-readable storage media configured to store instructions that, in response to being executed, cause the system to perform operations, the operations comprising:
identifying one or more computing systems corresponding to an autonomous vehicle (AV), wherein each computing system is configured to perform at least one operation of one or more operations relating to driving of the AV;

determining, for each of the computing systems, whether the computing systems use a first respective real-world parameter as an input to at least one of the operations or generate a second respective real-world parameter as an output of the at least one operation;

designating a respective operation corresponding to a respective computing system of the one or more computing systems for accelerated performance responsive to determining that the respective operation corresponding to the respective computing system does not use a respective third real-world parameter as the input or generate a fourth respective real-world parameter as the output; and performing a first operation and a second operation of the computing systems, wherein:

the first operation not designated for accelerated performance includes one or more first computations corresponding to the first operation and is performed after waiting for a particular time period; and the second operation designated for accelerated performance includes one or more second computations corresponding to the second operation and is performed without waiting for the particular time period.

16. The system of claim 15, wherein the operations relating to driving of the AV include a status update phase, a world update phase, a decision planning phase, and a control target update phase.

17. The system of claim 16, wherein the identified computing systems include a grading system configured to obtain and evaluate computational results output during the status update phase associated with operations of the AV.

18. The system of claim 17, wherein the identified computing systems include a map service system and a routing system, wherein:

the map service system is configured to determine one or more parameters associated with a world map that represents an environment in which the AV is driving generated during the world update phase; and the routing system is configured to determine a route for the AV to travel from a starting point to a destination, the decision planning phase performing one or more of the operations based on the determined route.

* * * * *